United States Patent
Miljevic

Patent Number: 5,807,526
Date of Patent: Sep. 15, 1998

[54] DEVICE FOR REMOVAL OF SO$_2$ AND NO$_x$ FROM FLUE GASES BY HIGH FREQUENCY DISCHARGE BY TESLA COIL OR OTHER HIGH VOLTAGE AND HIGH FREQUENCY GENERATOR

[76] Inventor: Vujo Miljevic, 45, Husinskih Rudara, St. 11060, Belgrade, Yugoslavia

[21] Appl. No.: 323,133

[22] Filed: Oct. 14, 1994

Related U.S. Application Data

[63] Continuation-in-part of Ser. No. 148,060, Nov. 5, 1993, abandoned.

[51] Int. Cl.$^6$ .................................................. F01N 3/08
[52] U.S. Cl. .......................... 422/174; 422/172; 422/199; 60/275; 204/156; 204/157.46; 204/157.49
[58] Field of Search .................................. 422/171, 172, 422/174, 178, 199; 204/177, 155–156, 157.46, 157.49, 173–174; 219/121.11, 121.12, 121.36, 121.42, 121.43; 373/14; 60/274–275; 423/242.1, 235, 532, 545; 95/28; 96/95, 96

[56] References Cited

U.S. PATENT DOCUMENTS

| | | | |
|---|---|---|---|
| 4,302,431 | 11/1981 | Atsukawa et al. | 422/172 |
| 4,376,637 | 3/1983 | Yang | 60/275 |
| 4,737,345 | 4/1988 | Henke | 422/172 |
| 4,945,721 | 8/1990 | Cornwell et al. | 60/274 |
| 4,979,364 | 12/1990 | Fleck | 60/274 |

FOREIGN PATENT DOCUMENTS

| | | | |
|---|---|---|---|
| 3026767 | 3/1978 | Japan | 204/157.49 |

*Primary Examiner*—Hien Tran
*Attorney, Agent, or Firm*—Ladas & Parry

[57] ABSTRACT

A device for removal of SO$_2$ and NO$_x$ from flue gas by high frequency discharge has a chamber having a first inlet opening for entry of flue gas into the chamber and an outlet opening for flue gas to exit from the chamber after removal of SO$_2$ and NO$_x$. A generator and electrode produce a high frequency electric field of sufficient strength in the chamber to produce high energy electrons that achieve both excitation and ionization potentials of N$_2$, O$_2$ and H$_2$O, whereby to produce free radicals of OH., O$_2$H., N., O. and H. which react with SO$_2$ and NO$_x$ molecules in the flue gas. A second inlet opening into the chamber adds ammonia to the SO$_2$ and NO$_x$ for reaction with the free radicals in neutralization producing ammonium salts from the SO$_2$ and NO$_x$ in the flue gas exiting from the chamber.

15 Claims, 5 Drawing Sheets

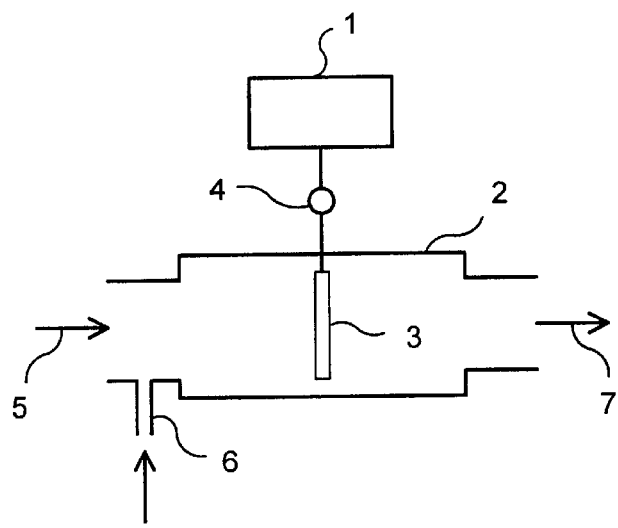
FIG. 1
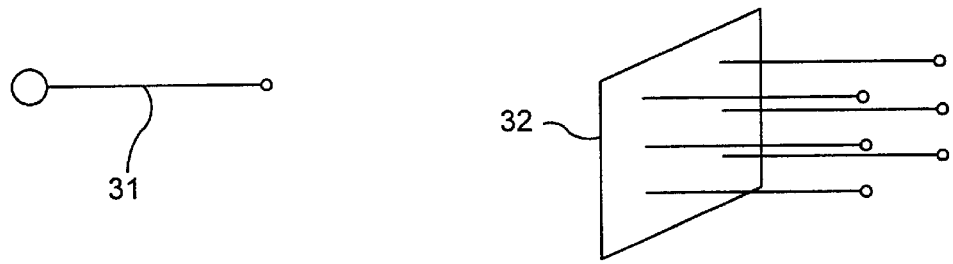
FIG. 2A    FIG. 2B
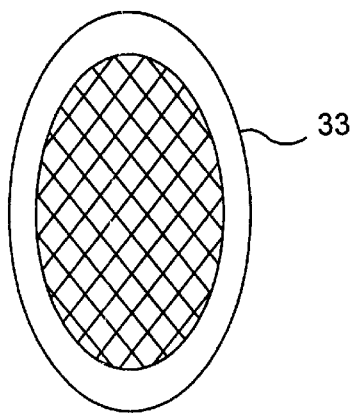 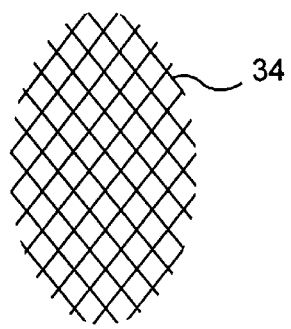 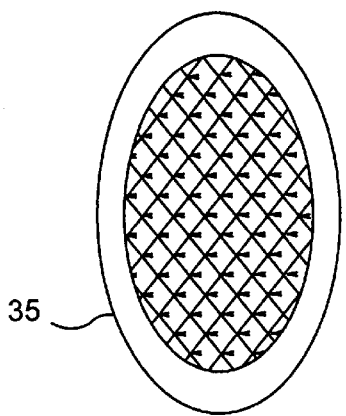
FIG. 2C    FIG. 2D    FIG. 2E

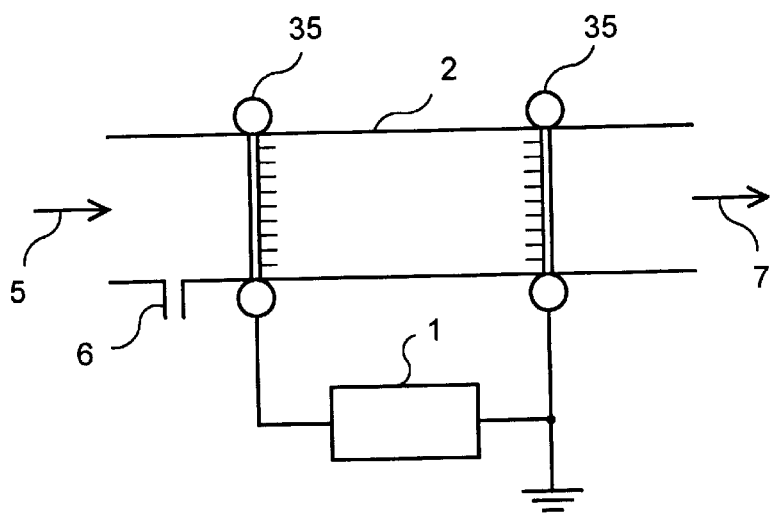
FIG. 3A
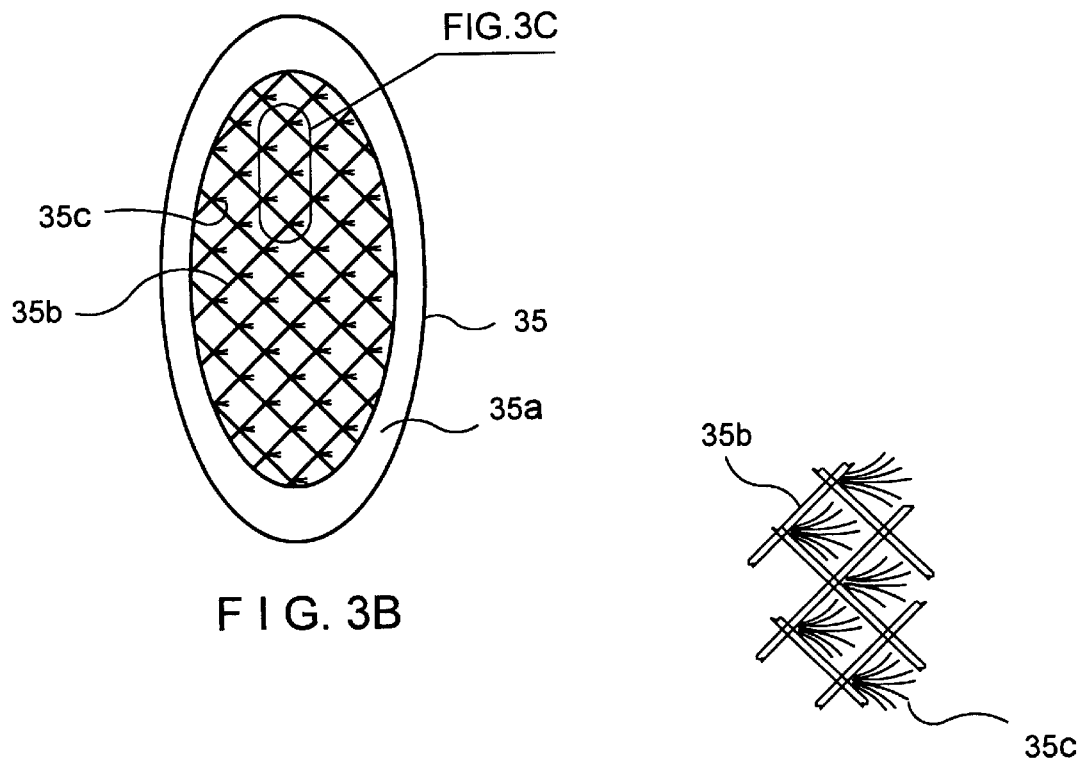
FIG. 3B
FIG. 3C

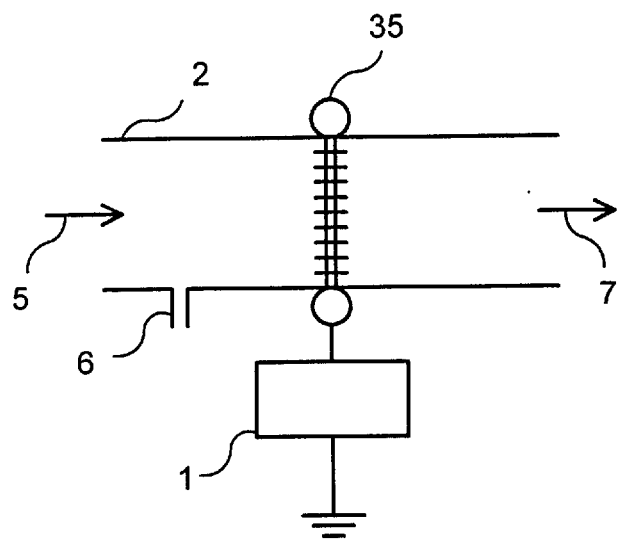
F I G. 3D
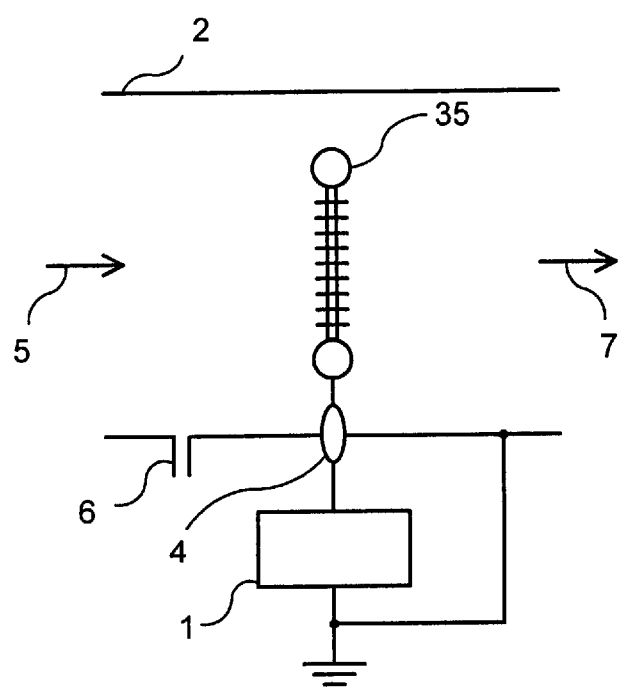
F I G. 3E

DEVICE FOR REMOVAL OF $SO_2$ AND $NO_x$ FROM FLUE GASES BY HIGH FREQUENCY DISCHARGE BY TESLA COIL OR OTHER HIGH VOLTAGE AND HIGH FREQUENCY GENERATOR

This is a continuation-in-part of application Ser. No. 08/148,060 filed on Nov. 5, 1993, now abandoned.

FIELD OF INVENTION

The invention belongs to the field of removal of $SO_2$ and $NO_x$ from flue gases which are the result of fossil fuel combustion or metallurgical processes. In the general case, the invention is used for filtering gases containing $SO_2$ and $NO_x$.

BACKGROUND OF INVENTION

The invention relates to a device for removal of $SO_2$ and $NO_x$ from flue gases by a new original type of high frequency corona discharge hereinafter sometimes called—the Corona Brush Discharge or, for short, CBD.

The existing methods for filtering of $SO_2$ and $NO_x$ from flue gases are chemical methods based on dry or wet procedures. The result of filtering, or by-product, is gypsum which has limited commercial value. It practically means that one kind of pollutant is turned into another kind, but a less harmful one. In this case, land is sacrificed for the storage of filtering products and mostly subterranean water is polluted.

The rate of efficiency of such technology is about 50% for $SO_2$ and the occasional regeneration of the installation is indispensable due to saturation. A special technology is used for the removal of $NO_x$.

A second method is based on the electron beam irradiation of flue gas in the presence of ammonia (in stoichiometric amount). This method has a high efficiency rate. Almost 100% for $SO_2$ and about 80%–90% for removal of $NO_x$, and it does not result in saturation.

Artificial fertilizer is obtained as an important by-product (ammonium sulfate and ammonium nitrate) which also has a commercial value. Since artificial fertilizer produced in such a way is used in agriculture, storage presents no problems.

Methods for removal of $SO_2$ and $NO_x$ from flue gases, which are based on the interactions of electrons with flue gas in the presence of ammonia is, unlike chemical methods, electronic methods or so called electronic filtering. Filters based on this method represent very promising devices for the removal of $SO_2$ and $NO_x$ from flue gases.

However, the inadequacies of this method are expensive accelerators that operate at high power, i.e. 100 kW and more.

Pilot plants based on this method have worked, however, under real conditions in the U.S.A., Japan, and Germany for several years, and since 1991 in Poland, too.

The next method for flue gas filtering is based on impulse corona discharge. Although the filter chamber is comparatively simple, the necessary high power impulse supply with a rise time amounting to a few $\mu s$ and of repetition rate up to 300 Hz is very expensive. The rate of efficiency is about 50–60%, and it is still in the experimental phase.

Corona discharge is formed around electrodes having sharp edges or pointed parts, i.e. at the part of the electrode surfaces with very high curvature. Examples are a point to plane, a wire and point, parallel wires, a wire in a cylinder, coaxial cylinder geometries. Corona discharge has long been studied and is relatively well known. The applications of corona are also well known, for example in electrostatic filters and in devices for ozone production (ozonizers).

SUMMARY OF THE INVENTION

The essence of the present invention is in a specially designed electrode or electrodes forming a new type of corona discharge, so that electrons oscillate in the chamber filled with flue gas. These high energy electrons excite, ionize, and dissociate molecules of mixture of flue gas and ammonia leading to a chemical reactions resulting finally in the removal of $SO_2$ and $NO_x$ and their conversion into ammonium salts.

A Tesla coil can be used as a high-frequency corona power supply that gives a very high voltage of over one million volts. Any other high-frequency and high-voltage power supply can also be used instead of a Tesla coil. However, the Tesla coil is probably the most efficient and is probably less expensive than any other type of generator or power supply. In the following text the expression "Tesla coil" will imply any type of high voltage and high frequency generator with continual or impulse operation.

An application of a magnetic field to a high-frequency corona (creating crossed electric and magnetic fields) increases additionally the efficiency of excitation and ionization, i.e., it increases the efficiency of the filtering of flue gases.

High efficiency, high voltage, long life time, simple construction and low production price are the main features of this novel corona brush discharge device for flue gas filtering of $SO_2$ and $NO_x$.

BRIEF DESCRIPTION OF THE DRAWINGS

FIG. 1 is a schematic cross-sectional view showing a device;

FIG. 2 represents different types of the electrodes of the device in FIG. 1;

FIG. 3A is a schematic cross-sectional view of an exemplary embodiment;

FIG. 3B is a perspective view of a brush-shaped electrode of an exemplary embodiment;

FIG. 3C is a expanded view of the part of brush-shaped electrode with brushes;

FIG. 3D is schematic cross-sectional view of the device with one brush shaped electrode when filter chamber is of non conductive material.

FIG. 3E is schematic cross-sectional view of the device with one brush shaped electrode when filter chamber is of conductive material.

DETAILED DESCRIPTION OF THE PREFERRED EMBODIMENT

Figure 3F:
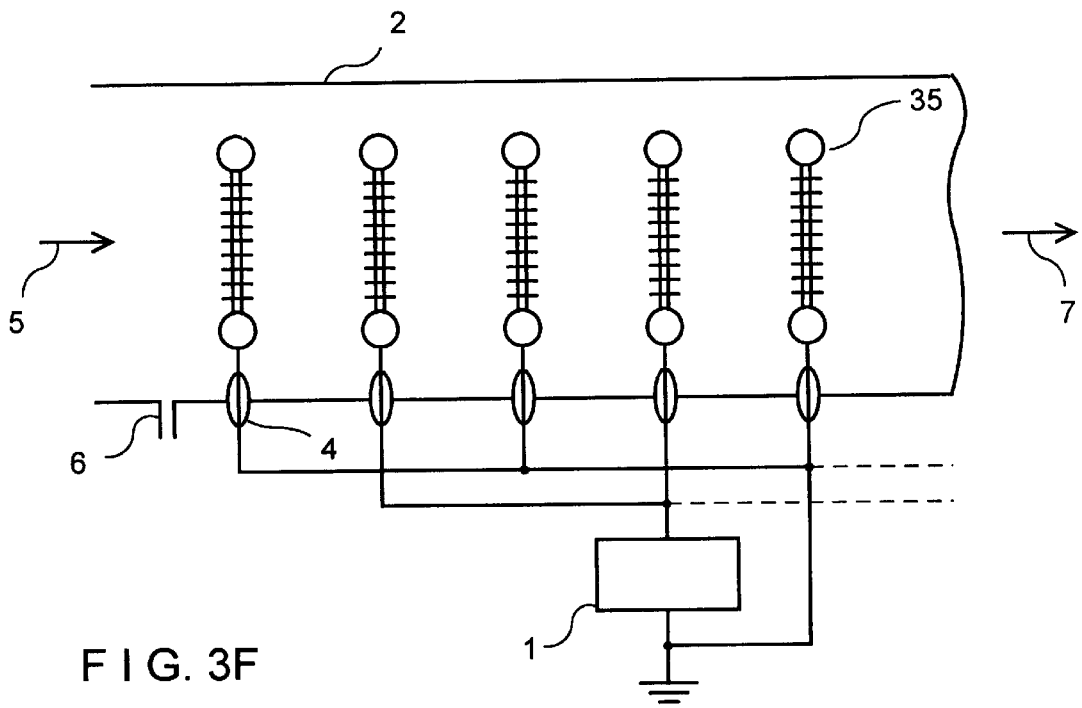
FIG. 3F is schematic cross-sectional of the device with many brush-shaped electrodes when filter chamber is of conductive non magnetic material.

A cross sectional view of the structure of a device in accordance with the first embodiment of the present invention is shown in FIG. 1.

This embodiment uses special new type of corona discharge—"Corona Brush Discharge" (CBD) as a means for generating plasma. The CBD is created in device which consists of the Tesla coil 1 and the filter chamber 2 with the specially designed electrode 3 connected to one side of the Tesla coil 1 through the feedthrough 4. One or more electrodes are represented by the electrode 3 in FIG. 1, and more details are presented below.

Flue gas enters filter chamber 2 from side 5. Ammonia is added in stoichiometric amount to flue gas through opening 6, so that the mixture of the flue gas and ammonia passes through the system of electrodes with high frequency field and exits through opening 7. Gas is further transported through pipe (not shown) to another filter (not shown), for example a bag filter, for removal of electronic filtering products—artificial fertilizers, and then it proceeds through tube to the atmosphere free of $SO_2$ and $NO_x$.

Filter chamber 2 can be a tube of different cross sectional shapes: circular, square rectangular, etc. Electrode 3 can have different shapes and some examples are shown in FIG. 2: a wire 31, a set of parallel wires 32, mesh with round edges 33, mesh with sharp tips 34, a number of pins 35, etc. Any type of these electrodes can be used either singly or in a number of mixed types or/and shapes. The chamber, if made of conductive material, may be used as an additional electrode together with the mentioned electrodes.

Embodiment 2

This is an exemplary embodiment which is schematically shown in FIG. 3A. The flue gas is directed into nonconductive filter chamber 2 from side 5. Ammonia is added in stoichiometric amount to flue gas through opening 6 so that the mixture of flue gas and ammonia passes through apertures in the two separated electrodes 35 connected to the Tesla coil 1, and exits throughout opening 7. Gas is further transported through the pipe to a filter for removal of byproducts (artificial fertilizers) and then through a stack to the atmosphere.

Two separated brush shaped electrodes 35 (FIG. 2) are used. Various pins (not shown) can also be used with various surface densities on the electrode. FIG. 3B is a perspective view showing a brush shaped electrode 35, and FIG. 3C is expanded view of part of electrode 35 with pins brush-like fastened to the electrode grating. Gratings 35b and brushes 35c in the form of stranded wires can be made, for example, of aluminum or stainless steel. The guard ring 35a on the electrode 35, with radius greater than a critical one, is used for electrostatic shielding to prevent edge breakdown. Electrodes of such a construction do not make a considerable obstacle to a flow of flue gas through them.

When the Tesla coil 1 is energized, corona discharge is established and it completely occupies the space between the electrodes—Corona Brush Discharge. In this case, uniform light is emitted from the whole volume between electrodes like a negative glow discharge. In general, the corona brush discharge is used in the device as a plasma generation means for production of the high energy electrons.

The high energy electrons create large numbers of ion pairs and excited molecules along their paths. The ions as $N_2^+$, $O_2^+$, $H_2O^+$, and excited molecules $N_2^*$, $O_2^*$, $H_2O^*$ react with water vapor and form free radicals $OH.,O_2H., N., O., H.$, which react with $SO_2$ and $NO_x$ molecules present in the flue gas. Sulpheric and nitric acids are produced according to reactions:

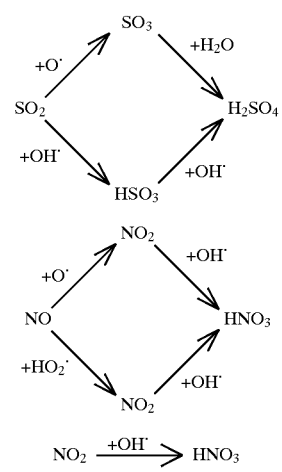

$$NO_2 \xrightarrow{+OH^-} HNO_3$$

In presence of ammonia, solid products of neutralization in the form of aerosol—artificial fertilizers are formed.

Embodiment 3

It is known that a critical electric gradient at the surface of a conductor is necessary to produce a visual corona in air. The critical gradient depends only on the conductor radius and is independent of the spacing of conductor. This independence of the separation would be expected since for large spacing the gap has little effect of the field at the surface of the conductor. The fact that the critical field strength at which corona appears for large spacings of conductors depends only on the conductor radius facilitates the estimation of the minimum radius of curvature of electrodes that are to be used at high voltages.

In the exemplary embodiment of the present invention the brush electrodes have very small radii of surface curvature at their tips so that the electrical field gradients at the tips are very large and specifically, greater than the critical one. This means that in the present invention only one brush electrode 35 is sufficient. The electrode 35 is connected to one terminal of the Tesla coil 1, while the second terminal is grounded. The filter chamber 2 can be made of conductive or non conductive material. FIG. 3D shows a device when the filter chamber is of non conductive material. Other details of the device (flue gas inlet 5, ammonia inlet 6, filter outlet 7) are the same as in the previous figures.

Embodiment 4

If the filter chamber 2 is of conductive material, then a breakdown between the brush electrode 35 and the chamber has to be prevented by choosing a sufficiently large diameter of the guard ring and a sufficiently large spacing between the guard ring and a wall of the chamber 2.

This embodiment is presented in FIG. 3E. Other details of the device (flue gas inlet 5, ammonia inlet 6, filter outlet 7) are the same as in previous figures.

Embodiment 5

Figure 3G:
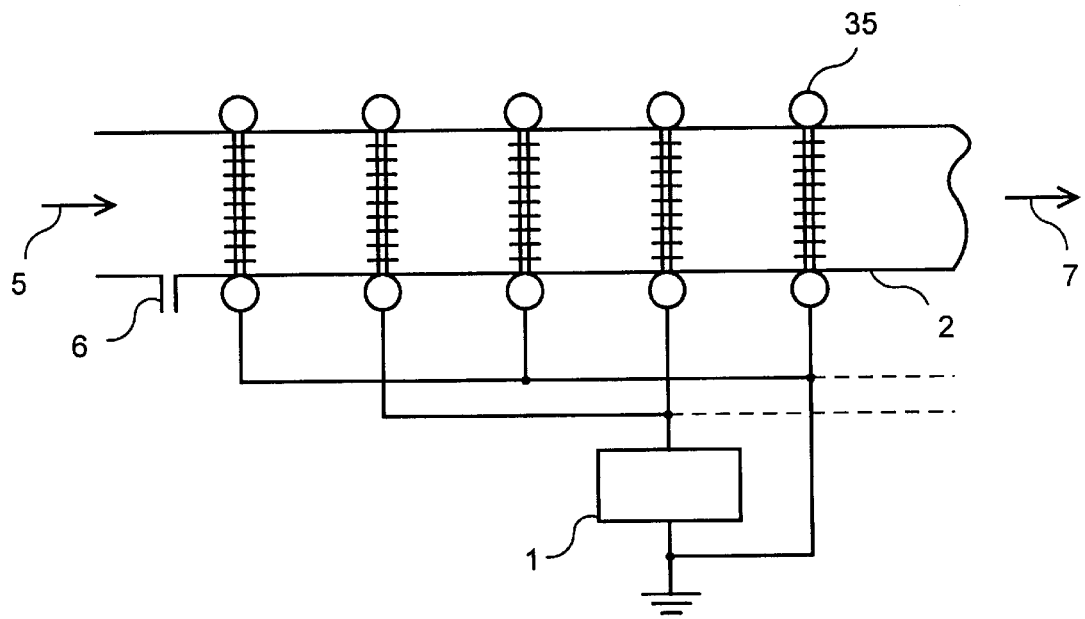
FIG. 3G is schematic cross-sectional of the device with many brush-shaped electrodes when filter chamber is of non conductive material.

Many electrodes placed serially in the flow of flue gas in the filter chamber of the device increase the efficiency of removal of $SO_2$ and $NO_x$. This embodiment comprises Tesla coil 1, filter chamber 2 of conductive and non magnetic material presented in FIG. 3F, or non conductive material shown in FIG. 3G, brush electrodes 35 with brushes on opposite sides, electrical feedthrough 4 to Tesla coil 1, flue gas inlet 5, ammonia inlet 6, and flue gas outlet 7.

Embodiment 6

In enhancement of the device efficiency is increased by applying a strong magnetic field in the electrode(s) region. In this case paths of the electrons are prolonged and form (in appropriate conditions) spiral-shaped trajectories. In this way probability for excitation, ionization, and dissociation is increased to increase the efficiency of the device.

Generally, motion of the electrons in crossed electric and magnetic fields is very complex and depends on the magnetic field intensity and axial and normal components of the electron velocity.

Figure 4A:
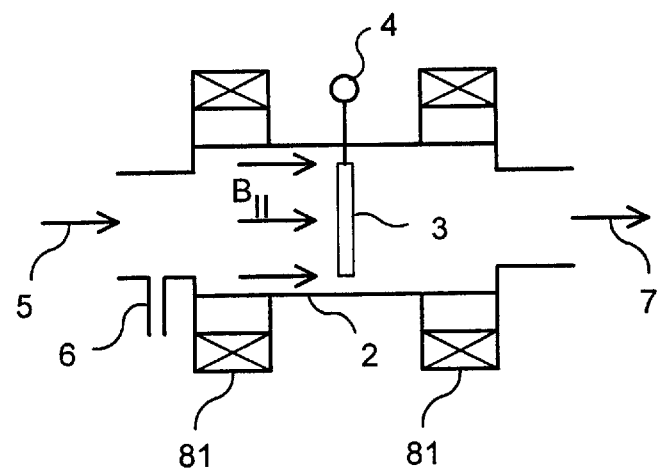
FIG. 4A is a schematic cross-sectional view of the device in FIG. 1 when a parallel magnetic field $B_\parallel$ is applied.

FIG. 4A is a schematic cross-sectional view of the device presented in FIG. 1 when a magnetic field $B_\parallel$ is applied parallel to the axis of device chamber, i.e., to the axis of the electrodes, is applied. This field can be obtained, for example, by Helmholtz coils, or permanent magnets 81.

Embodiment 7

Figure 4B:
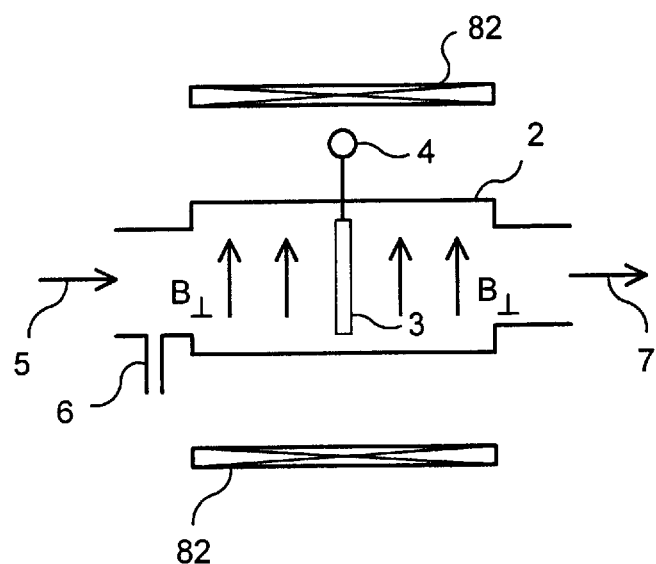
FIG. 4B is a schematic cross-sectional view of the device in FIG. 1 when a perpendicular magnetic field $B\perp$ is applied.

FIG. 4B is schematic cross-sectional view of the devices presented in FIG. 1 when a magnetic field $B\perp$ is applied perpendicular to the axis of the device chamber.

In this embodiment the magnetic field $B\perp$ perpendicular to the axis of the device chamber is obtained in the same way as in cyclotrons, for example between the poles 82 of an electro- or permanent magnet.

Obviously, many modifications and variations of the present invention are possible. It is therefore to be understood that, within the scope of the appended claims, the invention may be practiced otherwise than specifically described herein.

What is claimed is:

1. A device for removal of $SO_2$ and $NO_x$ from flue gas by high frequency discharge, the device comprising:

chamber means defining a chamber having a first inlet opening for entry of flue gas into the chamber and an outlet opening for flue gas exit from the chamber after removal of $SO_2$ and $NO_x$;

generator and electrode means for producing a high frequency electric field of sufficient strength in the chamber to produce high energy electrons that achieve both excitation and ionization potentials of $N_2$, $O_2$ and $H_2O$ in the flue gas, whereby to produce free radicals of OH., $O_2H$., N., O. and H. which react with $SO_2$ and $NO_x$ molecules in the flue gas; and a second inlet opening into the chamber for adding ammonia to the flue gas for reaction with the free radicals in neutralization producing ammonium salts from the $SO_2$ and $NO_x$ in the flue gas exit from the chamber, wherein:

the chamber means comprises a conductive non-magnetic housing;

the generator means comprises a Tesla coil; and the electrode means comprises an electrode in the chamber, the chamber having an axis, and the electrode comprises a grid with pins attached to nodes of the grid, a guard ring encompassing the edge of the grid, and connecting means for connecting the Tesla coil to the guard ring.

2. The device according to claim 1, and further comprising magnetic means for providing a magnetic field in the chamber parallel to the axis.

3. The device according to claim 1, and further comprising magnetic means for providing a magnetic field in the chamber perpendicular to the axis.

4. A device for removal of $SO_2$ and $NO_x$ from flue gas by high frequency discharge, the device comprising:

chamber means defining a chamber having a first inlet opening for entry of flue gas into the chamber and an outlet opening for flue gas exit from the chamber after removal of $SO_2$ and $NO_x$;

generator and electrode means for producing a high frequency electric field of sufficient strength in the chamber to produce high energy electrons that achieve both excitation and ionization potentials of $N_2$, $O_2$ and $H_2O$ in the flue gas, whereby to produce free radicals of OH., $O_2H$., N., O. and H. which react with $SO_2$ and $NO_x$ molecules in the flue gas; and a second inlet opening into the chamber for adding ammonia to the flue gas for reaction with the free radicals in neutralization producing ammonium salts from the $SO_2$ and $NO_x$ in the flue gas exit from the chamber, wherein:

the chamber means comprises a non-conductive housing;

the generator means comprises a Tesla coil; and the electrode means comprises an electrode in the chamber, the chamber having an axis, and the electrode comprises a grid with pins attached to nodes of the grid, a guard ring encompassing the edge of the grid, and connecting means for connecting the Tesla coil to the guard ring.

5. The device according to claim 4, and further comprising magnetic means for providing a magnetic field parallel to the axis.

6. The device according to claim 4, and further comprising magnetic means for providing a magnetic field perpendicular to the axis.

7. A device for removal of $SO_2$ and $NO_x$ from flue gas by high frequency discharge, the device comprising:

chamber means defining a chamber having a first inlet opening for entry of flue gas into the chamber and an outlet opening for flue gas exit from the chamber after removal of $SO_2$ and $NO_x$;

generator and electrode means for producing a high frequency electric field of sufficient strength in the chamber to produce high energy electrons that achieve both excitation and ionization potentials of $N_2$, $O_2$ and $H_2O$ in the flue gas, whereby to produce free radicals of OH., $O_2H$., N., O. and H. which react with $SO_2$ and $NO_x$ molecules in the flue gas; and a second inlet opening into the chamber for adding ammonia to the flue gas for reaction with the free radicals in neutralization producing ammonium salts from the $SO_2$ and $NO_x$ in the flue gas exit from the chamber, wherein:

the chamber means comprises a conductive non-magnetic housing;

the generator means comprises a Tesla coil; and the electrode means comprises two identical electrodes spaced from each other on an axis in the chamber and each comprising a grid with pins attached to nodes of the grid, a guard ring encompassing the edge of the grid, and connecting means for connecting the Tesla coil to the guard ring or each of the electrodes.

8. The device according to claim 7, and further comprising magnetic means for providing a magnetic field in the chamber parallel to the axis.

9. The device according to claim 7, and further comprising magnetic means for providing a magnetic field in the chamber perpendicular to the axis.

10. A device for removal of $SO_2$ and $NO_x$ from flue gas by high frequency discharge, the device comprising:

chamber means defining a chamber having a first inlet opening for entry of flue gas into the chamber and an outlet opening for flue gas exit from the chamber after removal of $SO_2$ and $NO_x$;

generator and electrode means for producing a high frequency electric field of sufficient strength in the chamber to produce high energy electrons that achieve both excitation and ionization potentials of $N_2$, $O_2$ and $H_2O$ in the flue gas, whereby to produce free radicals of OH., $O_2$H., N., O. and H. which react with $SO_2$ and $NO_x$ molecules in the flue gas; and a second inlet opening into the chamber for adding ammonia to the flue gas for reaction with the free radicals in neutralization producing ammonium salts from the $SO_2$ and $NO_x$ in the flue gas exit from the chamber, wherein:

the chamber means comprises a conductive non-magnetic housing, the generator means comprises a Tesla coil; and the electrode means comprises identical electrodes spaced from each other serially along an axis in the chamber for being along a flow of the flue gas from the first inlet to the outlet, each of the electrodes comprising a grid with pins attached to nodes of the grid, a guard ring encompassing the edge of the grid, and connecting means for connecting the Tesla coil to the guard ring of each of the electrodes.

11. The device according to claim 10, and further comprising magnetic means for providing a magnetic field parallel to the axis.

12. The device according to claim 10, and further comprising magnetic means for providing a magnetic field perpendicular to the axis.

13. A device for removal of $SO^2$ and $NO_x$ from flue gas by high frequency discharge, the device comprising:

chamber means defining a chamber having a first inlet opening for entry of flue gas into the chamber and an outlet opening for flue gas exit from the chamber after removal of $SO_2$ and $NO_x$;

generator and electrode means for producing a high frequency electric field of sufficient strength in the chamber to produce high energy electrons that achieve both excitation and ionization potentials of $N_2$, $O_2$ and $H_2O$, whereby to produce free radicals of OH., $O_2$H., N., O. and H. which react with $SO_2$ and $NO_x$ molecules in the flue gas; and a second inlet opening into the chamber for adding ammonia to the $SO_2$ and $NO_x$ for reaction with the free radicals in neutralization producing ammonium salts from the $SO_2$ and $NO_x$ in the flue gas exit from the chamber, wherein:

the chamber means comprises a non-conductive housing;

the generator means comprises a Tesla coil; and the electrode means comprises identical electrodes spaced from each other serially along an axis in the chamber for being in a flow of the flue gas from the first inlet to the outlet, each of the electrodes comprising a grid with pins attached to nodes of the grid, a guard ring encompassing the edge of the grid, each guard ring being attached to the housing, and connecting means for connecting the Tesla coil to the guard ring of each of the electrodes.

14. The device according to claim 13, and further comprising magnetic means for providing a magnetic field parallel to the axis.

15. The device according to claim 13, and further comprising magnetic means for providing a magnetic field perpendicular to the axis.

* * * * *